US010827071B1

(12) United States Patent
Adibi et al.

(10) Patent No.: US 10,827,071 B1
(45) Date of Patent: Nov. 3, 2020

(54) SYSTEM AND METHOD FOR SMS AND EMAIL ENABLED AUTOMATED AGENT ASSISTANCE WITHIN A CLOUD-BASED CONTACT CENTER

(71) Applicant: Talkdesk, Inc., San Francisco, CA (US)

(72) Inventors: Jafar Adibi, Los Angeles, CA (US); Tiago Paiva, San Francisco, CA (US); Charanya Kannan, Oakland, CA (US); Bruno Antunes, Sáo Silvestre (PT); Joao Carmo, Oporto (PT); Marco Costa, Lisbon (PT)

(73) Assignee: TALKDESK INC., San Francisco, CA (US)

( * ) Notice: Subject to any disclaimer, the term of this patent is extended or adjusted under 35 U.S.C. 154(b) by 0 days.

(21) Appl. No.: 16/668,184

(22) Filed: Oct. 30, 2019

Related U.S. Application Data

(60) Provisional application No. 62/870,913, filed on Jul. 5, 2019.

(51) Int. Cl.
| | |
|---|---|
| *H04M 3/51* | (2006.01) |
| *G10L 15/18* | (2013.01) |
| *G10L 15/22* | (2006.01) |
| *G10L 25/63* | (2013.01) |
| *G10L 15/30* | (2013.01) |
| *G06F 16/953* | (2019.01) |
| *G06F 9/54* | (2006.01) |
| *G10L 15/08* | (2006.01) |

(52) U.S. Cl.
CPC .......... *H04M 3/5183* (2013.01); *G06F 9/54* (2013.01); *G06F 16/953* (2019.01); *G10L 15/1815* (2013.01); *G10L 15/1822* (2013.01); *G10L 15/22* (2013.01); *G10L 15/30* (2013.01); *G10L 25/63* (2013.01); *G10L 2015/088* (2013.01); *G10L 2015/223* (2013.01); *H04M 2203/558* (2013.01); *H04M 2203/6045* (2013.01)

(58) Field of Classification Search
CPC .............. G10L 15/22; G10L 15/1822; H04M 2201/41; H04M 2201/40; H04M 3/5141; H04M 3/5191
USPC ........... 379/265.09, 265.05, 265.11, 265.01, 379/88.01
See application file for complete search history.

(56) References Cited

U.S. PATENT DOCUMENTS

| | | | |
|---|---|---|---|
| 2016/0191709 A1* | 6/2016 | Pullamplavil | G10L 25/48 379/266.07 |
| 2018/0114234 A1* | 4/2018 | Fighel | G06F 11/3409 |

* cited by examiner

*Primary Examiner* — Thjuan K Addy

(57) ABSTRACT

Methods to reduce agent effort and improve customer experience quality through artificial intelligence. The Agent Assist tool provides contact centers with an innovative tool designed to reduce agent effort, improve quality and reduce costs by minimizing search and data entry tasks The Agent Assist tool is natively built and fully unified within the agent interface while keeping all data internally protected from third-party sharing.

20 Claims, 13 Drawing Sheets

SYSTEM AND METHOD FOR SMS AND EMAIL ENABLED AUTOMATED AGENT ASSISTANCE WITHIN A CLOUD-BASED CONTACT CENTER

CROSS-REFERENCE TO RELATED APPLICATION

This application claims priority to U.S. Provisional Patent Application No. 62/870,913, filed Jul. 5, 2019, entitled "SYSTEM AND METHOD FOR AUTOMATION WITHIN A CLOUD-BASED CONTACT CENTER," which is incorporated herein by reference in its entirety.

BACKGROUND

Today, contact centers are primarily on-premise software solutions. This requires an enterprise to make a substantial investment in hardware, installation and regular maintenance of such solutions. Using on-premise software, agents and supervisors are stationed in an on-site call center. In addition, a dedicated IT staff is required because on-site software may be too complicated for supervisors and agents to handle on their own. Another drawback of on-premise solutions is that such solutions cannot be easily enhanced to include capabilities to that meet the current demands of technology, such as automation. Thus, there is a need for a solution to enhance the agent experience to enhance the interactions with customers who interact with contact centers.

SUMMARY

Disclosed herein are systems and methods for providing a cloud-based contact center solution providing agent automation through the use of e.g., artificial intelligence and the like.

In accordance with an aspect, there is disclosed a method, comprising executing an automation infrastructure within a cloud-based contact center that includes a communication manager, speech-to-text converter, a natural language processor, and an inference processor exposed by application programming interfaces; and executing an agent assist functionality within the automation infrastructure that performs operations comprising: receiving a SMS text communication from a customer; performing inference processing on the SMS text to determine a customer intent; automatically analyzing the SMS text to determine a subject of the SMS text communication and key terms associated with the subject; automatically parsing a knowledgebase using the key terms for at least one responsive answer associated with the subject; and providing the solution to an agent in a unified interface during the communication with the customer. In accordance with another aspect, a cloud-based software platform is disclosed in which the example method above is performed.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described within a cloud-based contact center, it will become evident to those skilled in the art that the implementations are not limited thereto.

The present disclosure is generally directed to a cloud-based contact center and, more particularly, methods and systems for proving intelligent, automated services within a cloud-based contact center. With the rise of cloud-based computing, contact centers that take advantage of this infrastructure are able to quickly add new features and channels. Cloud-based contact centers improve the customer experience by leveraging application programming interfaces (APIs) and software development kits (SDKs) to allow the contact center to change in in response to an enterprise's needs. For example, communications channels may be easily added as the APIs and SDKs enable adding channels, such as SMS/MMS, social media, web, etc. Cloud-based contact centers provide a platform that enables frequent updates. Yet another advantage of cloud-based contact centers is increased reliability, as cloud-based contact centers may be strategically and geographically distributed around the world to optimally route calls to reduce latency and provide the highest quality experience. As such, customers are connected to agents faster and more efficiently.

Example Cloud-Based Contact Center Architecture

Figure 1:
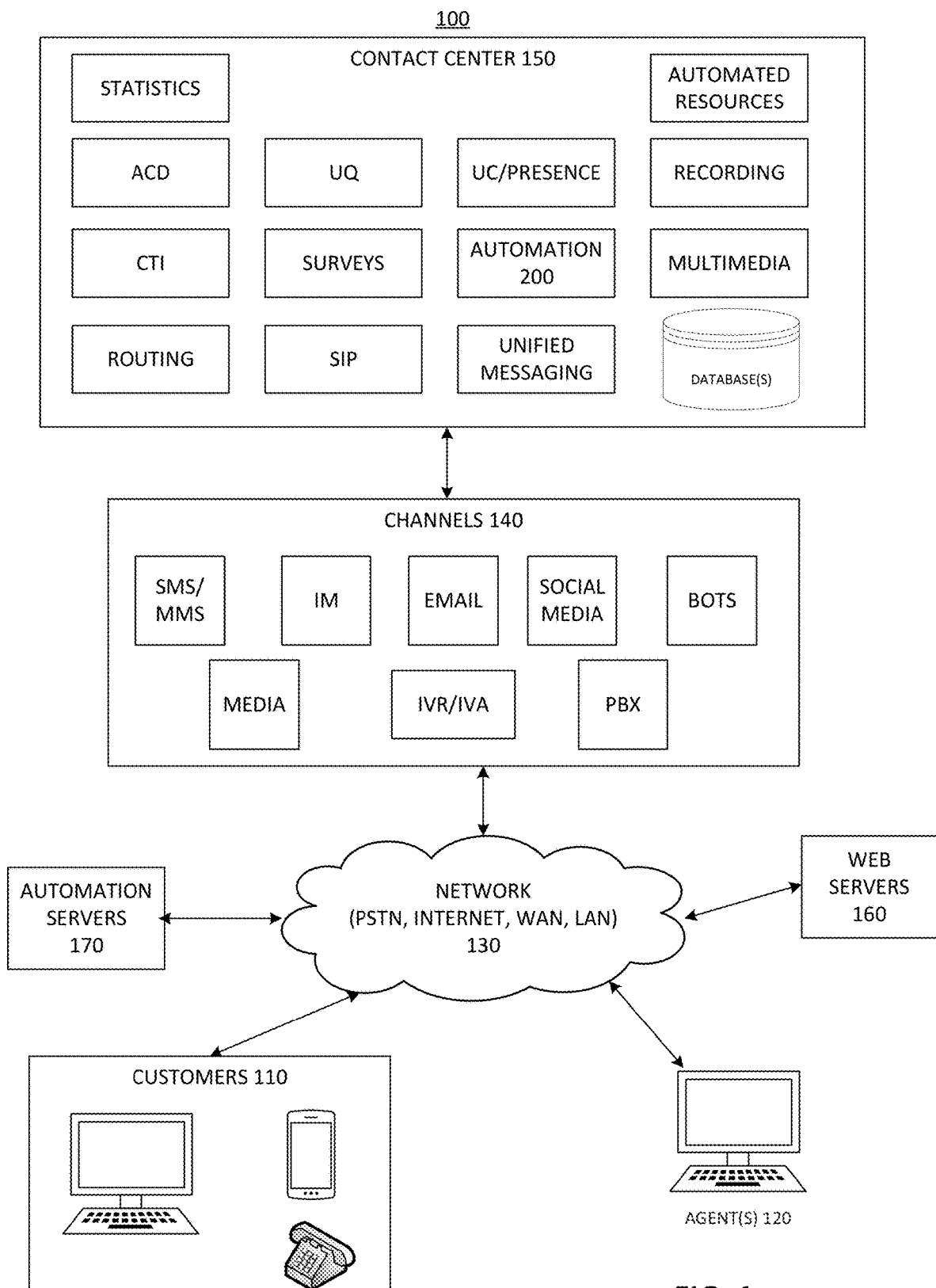
FIG. 1 illustrates an example environment.

FIG. 1 is an example system architecture 100, and illustrates example components, functional capabilities and optional modules that may be included in a cloud-based contact center infrastructure solution. Customers 110 interact with a contact center 150 using voice, email, text, and web interfaces in order to communicate with agent(s) 120 through a network 130 and one or more channels 140. The agent(s) 120 may be remote from the contact center 150 and handle communications with customers 110 on behalf of an enterprise or other entity. The agent(s) 120 may utilize devices, such as but not limited to, work stations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network. The network types are provided by way of example and are not intended to limit types of networks used for communications.

The contact center 150 may be cloud-based and distributed over a plurality of locations. The contact center 150 may include servers, databases, and other components. In particular, the contact center 150 may include, but is not limited to, a routing server, a SIP server, an outbound server, automated call distribution (ACD), a computer telephony integration server (CTI), an email server, an IM server, a social server, a SMS server, and one or more databases for routing, historical information and campaigns.

The routing server may serve as an adapter or interface between the switch and the remainder of the routing, monitoring, and other communication-handling components of the contact center. The routing server may be configured to process PSTN calls, VoIP calls, and the like. For example, the routing server may be configured with the CTI server software for interfacing with the switch/media gateway and contact center equipment. In other examples, the routing server may include the SIP server for processing SIP calls. The routing server may extract data about the customer interaction such as the caller's telephone number (often known as the automatic number identification (ANI) number), or the customer's internet protocol (IP) address, or email address, and communicate with other contact center components in processing the interaction.

The ACD is used by inbound, outbound and blended contact centers to manage the flow of interactions by routing and queuing them to the most appropriate agent. Within the CTI, software connects the ACD to a servicing application (e.g., customer service, CRM, sales, collections, etc.), and looks up or records information about the caller. CTI may display a customer's account information on the agent desktop when an interaction is delivered.

For inbound SIP messages, the routing server may use statistical data from the statistics server and a routing database to the route SIP request message. A response may be sent to the media server directing it to route the interaction to a target agent 120. The routing database may include: customer relationship management (CRM) data; data pertaining to one or more social networks (including, but not limited to network graphs capturing social relationships within relevant social networks, or media updates made by members of relevant social networks); agent skills data; data extracted from third party data sources including cloud-based data sources such as CRM; or any other data that may be useful in making routing decisions.

Customers 110 may initiate inbound communications (e.g., telephony calls, emails, chats, video chats, social media posts, etc.) to the contact center 150 via an end user device. End user devices may be a communication device, such as, a telephone, wireless phone, smart phone, personal computer, electronic tablet, etc., to name some non-limiting examples. Customers 110 operating the end user devices may initiate, manage, and respond to telephone calls, emails, chats, text messaging, web-browsing sessions, and other multi-media transactions. Agent(s) 120 and customers 110 may communicate with each other and with other services over the network 130. For example, a customer calling on telephone handset may connect through the PSTN and terminate on a private branch exchange (PBX). A video call originating from a tablet may connect through the network 130 terminate on the media server. The channels 140 are coupled to the communications network 130 for receiving and transmitting telephony calls between customers 110 and the contact center 150. A media gateway may include a telephony switch or communication switch for routing within the contact center. The switch may be a hardware switching system or a soft switch implemented via software. For example, the media gateway may communicate with an automatic call distributor (ACD), a private branch exchange (PBX), an IP-based software switch and/or other switch to receive Internet-based interactions and/or telephone network-based interactions from a customer 110 and route those interactions to an agent 120. More detail of these interactions is provided below.

As another example, a customer smartphone may connect via the WAN and terminate on an interactive voice response (IVR)/intelligent virtual agent (IVA) components. IVR are self-service voice tools that automate the handling of incoming and outgoing calls. Advanced IVRs use speech recognition technology to enable customers 110 to interact with them by speaking instead of pushing buttons on their phones. IVR applications may be used to collect data, schedule callbacks and transfer calls to live agents. IVA systems are more advanced and utilize artificial intelligence (AI), machine learning (ML), advanced speech technologies (e.g., natural language understanding (NLU)/natural language processing (NLP)/natural language generation (NLG)) to simulate live and unstructured cognitive conversations for voice, text and digital interactions. IVA systems may cover a variety of media channels in addition to voice, including, but not limited to social media, email, SMS/MMS, IM, etc. and they may communicate with their counterpart's application (not shown) within the contact center 150. The IVA system may be configured with a script for querying customers on their needs. The IVA system may ask an open-ended questions such as, for example, "How can I help you?" and the customer 110 may speak or otherwise enter a reason for contacting the contact center 150. The customer's response may then be used by a routing server to route the call or communication to an appropriate contact center resource.

In response, the routing server may find an appropriate agent 120 or automated resource to which an inbound customer communication is to be routed, for example, based on a routing strategy employed by the routing server, and further based on information about agent availability, skills, and other routing parameters provided, for example, by the statistics server. The routing server may query one or more databases, such as a customer database, which stores information about existing clients, such as contact information, service level agreement requirements, nature of previous customer contacts and actions taken by contact center to resolve any customer issues, etc. The routing server may query the customer information from the customer database via an ANI or any other information collected by the IVA system.

Once an appropriate agent and/or automated resource is identified as being available to handle a communication, a connection may be made between the customer 110 and an agent device of the identified agent 120 and/or the automate resource. Collected information about the customer and/or the customer's historical information may also be provided to the agent device for aiding the agent in better servicing the communication. In this regard, each agent device may include a telephone adapted for regular telephone calls, VoIP calls, etc. The agent device may also include a computer for communicating with one or more servers of the contact center and performing data processing associated with contact center operations, and for interfacing with customers via voice and other multimedia communication mechanisms.

The contact center 150 may also include a multimedia/social media server for engaging in media interactions other than voice interactions with the end user devices and/or other web servers 160. The media interactions may be related, for example, to email, vmail (voice mail through email), chat, video, text-messaging, web, social media, co-browsing, etc. In this regard, the multimedia/social media server may take the form of any IP router conventional in the art with specialized hardware and software for receiving, processing, and forwarding multi-media events.

The web servers 160 may include, for example, social media sites, such as, Facebook, Twitter, Instagram, etc. In this regard, the web servers 160 may be provided by third parties and/or maintained outside of the contact center 160 that communicate with the contact center 150 over the network 130. The web servers 160 may also provide web pages for the enterprise that is being supported by the contact center 150. End users may browse the web pages and get information about the enterprise's products and services. The web pages may also provide a mechanism for contacting the contact center, via, for example, web chat, voice call, email, WebRTC, etc.

The integration of real-time and nonreal-time communication services may be performed by unified communications (UC)/presence sever. Real-time communication services include Internet Protocol (IP) telephony, call control, instant messaging (IM)/chat, presence information, real-time video and data sharing. Non-real-time applications include voicemail, email, SMS and fax services. The communications services are delivered over a variety of communications devices, including IP phones, personal computers (PCs), smartphones and tablets. Presence provides real-time status information about the availability of each person in the network, as well as their preferred method of communication (e.g., phone, email, chat and video).

Recording applications may be used to capture and play back audio and screen interactions between customers and agents. Recording systems should capture everything that happens during interactions and what agents do on their desktops. Surveying tools may provide the ability to create and deploy post-interaction customer feedback surveys in voice and digital channels. Typically, the IVR/IVA development environment is leveraged for survey development and deployment rules. Reporting/dashboards are tools used to track and manage the performance of agents, teams, departments, systems and processes within the contact center.

Automation

As shown in FIG. 1, automated services may enhance the operation of the contact center 150. In one aspect, the automated services may be implemented as an application running on a mobile device of a customer 110, one or more cloud computing devices (generally labeled automation servers 170 connected to the end user device over the network 130), one or more servers running in the contact center 150 (e.g., automation infrastructure 200), or combinations thereof.

Figure 2:
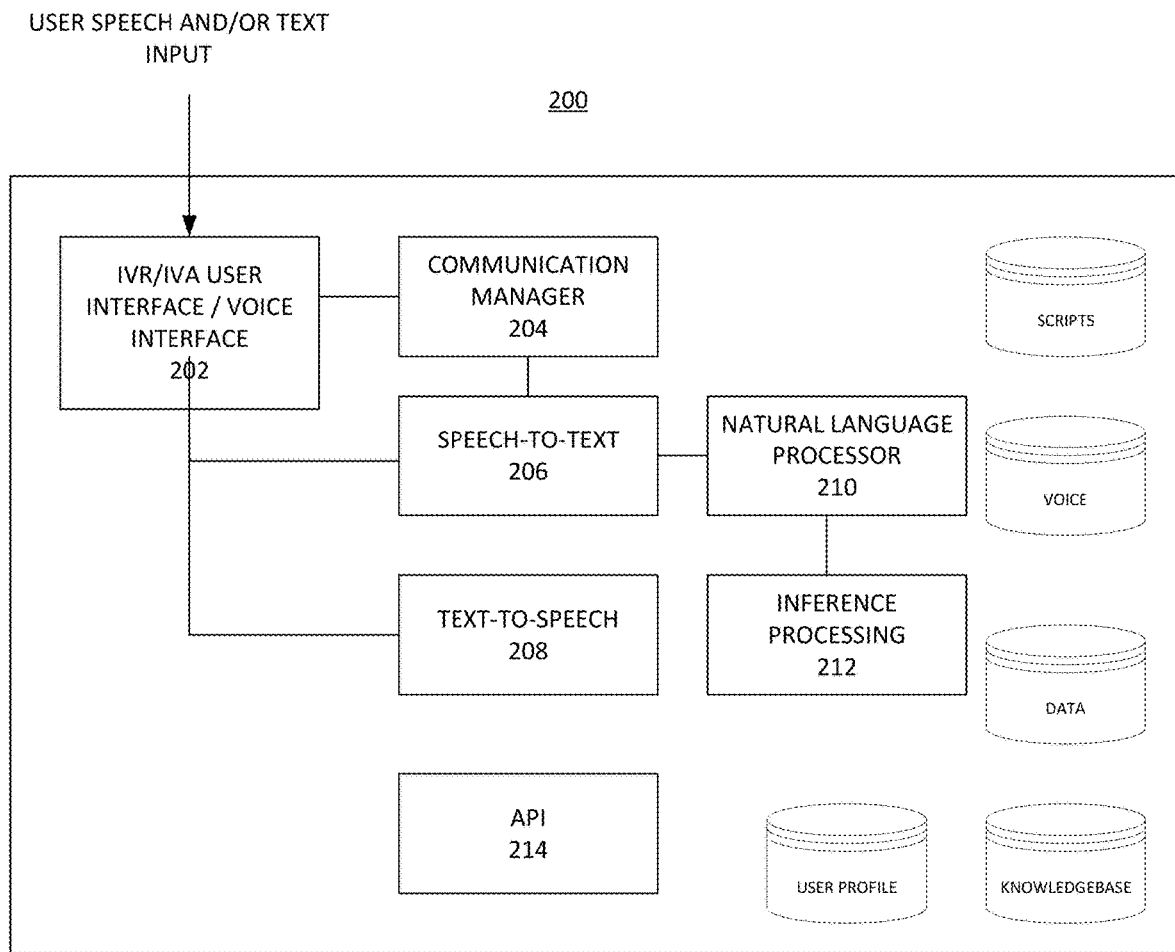
FIG. 2 illustrates example component that provide automation, routing and/or omnichannel functionalities within the context of the environment of FIG. 1.

With respect to the cloud-based contact center, FIG. 2 illustrates an example automation infrastructure 200 implemented within the cloud-based contact center 150. The automation infrastructure 200 may automatically collect information from a customer 110 user through, e.g., a user interface/voice interface 202, where the collection of information may not require the involvement of a live agent. The user input may be provided as free speech or text (e.g., unstructured, natural language input). This information may be used by the automation infrastructure 200 for routing the customer 110 to an agent 120, to automated resources in the contact center 150, as well as gathering information from other sources to be provided to the agent 120. In operation, the automation infrastructure 200 may parse the natural language user input using a natural language processing module 210 to infer the customer's intent using an intent inference module 212 in order to classify the intent. Where the user input is provided as speech, the speech is transcribed into text by a speech-to-text system 206 (e.g., a large vocabulary continuous speech recognition or LVCSR system) as part of the parsing by the natural language processing module 210. The communication manager 204 monitors user inputs and presents notifications within the user interface/voice interface 202. Responses by the automation infrastructure 200 to the customer 110 may be provided as speech using the text-to-speech system 208.

The intent inference module automatically infers the customer's 110 intent from the text of the user input using artificial intelligence or machine learning techniques. These artificial intelligence techniques may include, for example, identifying one or more keywords from the user input and searching a database of potential intents (e.g., call reasons) corresponding to the given keywords. The database of potential intents and the keywords corresponding to the intents may be automatically mined from a collection of historical interaction recordings, in which a customer may provide a statement of the issue, and in which the intent is explicitly encoded by an agent.

Some aspects of the present disclosure relate to automatically navigating an IVR system of a contact center on behalf of a user using, for example, the loaded script. In some implementations of the present disclosure, the script includes a set of fields (or parameters) of data that are expected to be required by the contact center in order to resolve the issue specified by the customer's 110 intent. In some implementations of the present disclosure, some of the fields of data are automatically loaded from a stored user profile. These stored fields may include, for example, the customer's 110 full name, address, customer account numbers, authentication information (e.g., answers to security questions) and the like.

Some aspects of the present disclosure relate to the automatic authentication of the customer 110 with the provider. For example, in some implementations of the present disclosure, the user profile may include authentication information that would typically be requested of users accessing customer support systems such as usernames, account identifying information, personal identification information (e.g., a social security number), and/or answers to security questions. As additional examples, the automation infrastructure 200 may have access to text messages and/or email messages sent to the customer's 110 account on the end user device in order to access one-time passwords sent to the customer 110, and/or may have access to a one-time password (OTP) generator stored locally on the end user device. Accordingly, implementations of the present disclosure may be capable of automatically authenticating the customer 110 with the contact center prior to an interaction.

In some implementations of the present disclosure an application programming interface (API) is used to interact with the provider directly. The provider may define a protocol for making commonplace requests to their systems. This API may be implemented over a variety of standard protocols such as Simple Object Access Protocol (SOAP) using Extensible Markup Language (XML), a Representational State Transfer (REST) API with messages formatted using XML or JavaScript Object Notation (JSON), and the like. Accordingly, a customer experience automation system 200 according to one implementation of the present disclosure automatically generates a formatted message in accordance with an API define by the provider, where the message contains the information specified by the script in appropriate portions of the formatted message.

Some aspects of the present disclosure relate to systems and methods for automating and augmenting aspects of an interaction between the customer 110 and a live agent of the contact center. In an implementation, once a interaction, such as through a phone call, has been initiated with the agent 120, metadata regarding the conversation is displayed to the customer 110 and/or agent 120 in the UI throughout the interaction. Information, such as call metadata, may be presented to the customer 110 through the UI 205 on the customer's 110 mobile device 105. Examples of such information might include, but not be limited to, the provider, department call reason, agent name, and a photo of the agent.

According to some aspects of implementations of the present disclosure, both the customer 110 and the agent 120 can share relevant content with each other through the application (e.g., the application running on the end user device). The agent may share their screen with the customer 110 or push relevant material to the customer 110.

In yet another implementation, the automation infrastructure 200 may also "listen" in on the conversation and automatically push relevant content from a knowledge base to the customer 110 and/or agent 120. For example, the application may use a real-time transcription of the customer's input (e.g., speech) to query a knowledgebase to provide a solution to the agent 120. The agent may share a document describing the solution with the customer 110. The application may include several layers of intelligence where it gathers customer intelligence to learn everything it can about why the customer 110 is calling. Next, it may perform conversation intelligence, which is extracting more context about the customer's intent. Next, it may perform interaction intelligence to pull information from other sources about customer 100. The automation infrastructure 200 may also perform contact center intelligence to implement WFM/WFO features of the contact center 150.

Agent Assist Overview

Thus, in the context of FIGS. 1-2, the present disclosure provides improvements by providing an innovative tool to reduce agent effort and improve customer experience quality through artificial intelligence (referred to herein as "Agent Assist"). Agent Assist is an innovative tool used within e.g., contact centers, designed to reduce agent effort, improve quality and reduce costs by minimizing search and data entry tasks Agent Assist is fully unified within the agent interface while keeping all data internally protected from third-party sharing. Agent Assist improve quality and reduce costs by minimizing search and data entry tasks through the use of AI capabilities. Agent Assist simplifies agent effort and improves Customer Satisfaction/Net Promoter Score CSAT/NPS.

Agent Assist is powered by artificial intelligence (AI) to provide real-time guidance for frontline employees to respond to customer needs quickly and accurately. For example, as a customer 110 states a need, agents 120 are provided answers or supporting information immediately to expedite the conversation and simplify tasks. Agent Assist determines why customers are calling and what their intent is. Similarly, IVR assist makes recommendations to a supervisor to optimize IVR for a better customer experience, for example, Agent Assist helps optimize IVR questions to match customers' reasons for calling and what their intent is.

By leveraging automated assistance and reducing agent-supervisor ad-hoc interactions, Agent Assist gives supervisors more time to focus on workforce engagement activities. Agent Assist reduces manual supervision and assistance. Agent Assist improves agent proficiency and accuracy. Agent Assist reduces short and long term training efforts through real-time error identification, eliminates busy work with smart note technology (the ability to systematically recognize and enter all key aspects of an interaction into the conversation notes); and improved handle time with in-app automations.

Figure 3:
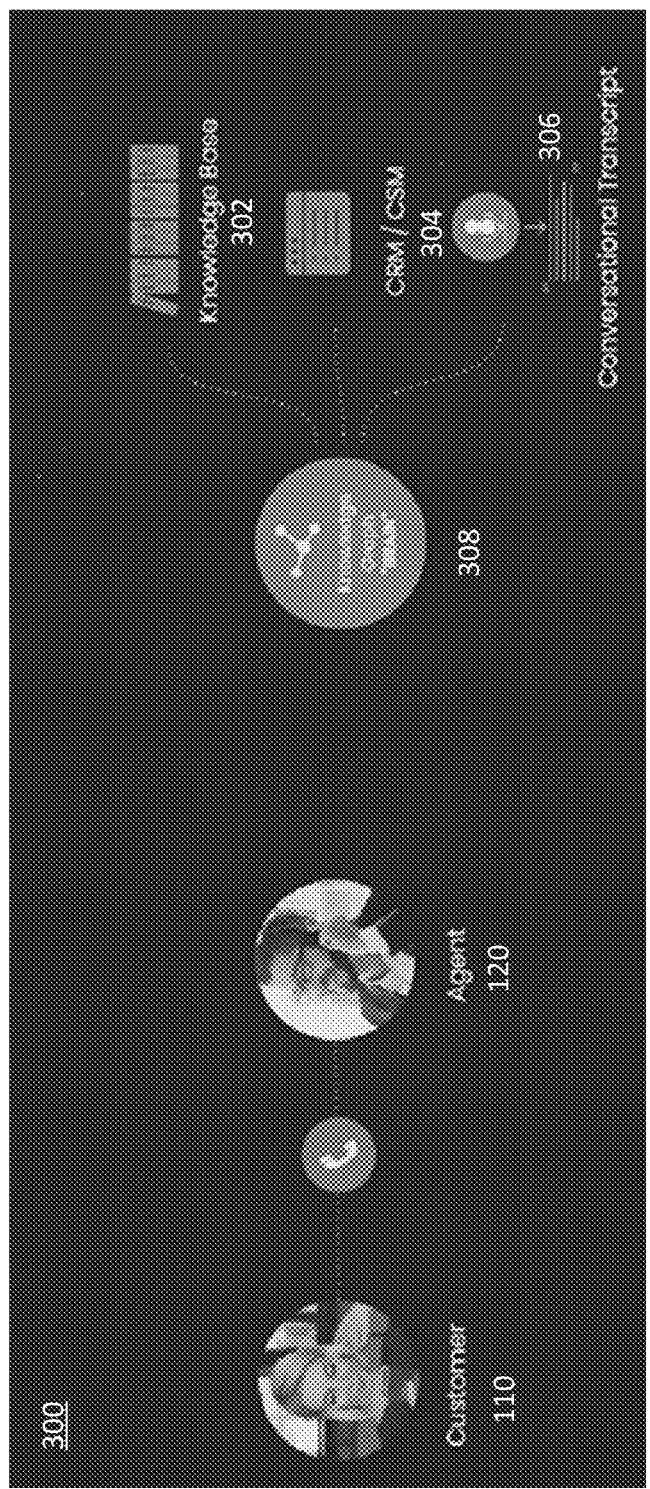
FIG. 3 illustrates a high-level overview of interactions, components and flow of Agent Assist in accordance with the present disclosure.

With reference to FIG. 3, there is illustrated a high-level overview of interactions, components and flow of Agent Assist in accordance with the present disclosure. In operation, a customer 110 will contact the cloud-based contact center 150 through one or more of the channels 140. as shown in FIG. 1. The agent 120 to whom the customer 110 is routed may listen to the customer 110 while the same time the Agent Assist functionality pulls information using a knowledge graph engine 308. The knowledge graph engine 312 gathers information from from one or more of a knowledgebase 302, a customer relationship management (CRM) platform/a customer service management (CSM) platform 304, and/or conversational transcripts 306 of other agent conversations to provide contextually relevant information to the agent. Additionally, information captured within the agent interface (see, FIGS. 5A-5C, 7 and 13) can be automatically added to account profiles or work item tickets, within the CRM, without any additional agent effort. Agent Assist is an intelligent advisory tool which supplies data-driven real-time recommendations, next best actions and automations to aid agents in customer interactions and guide them to quality and outcome excellency. This may include making recommendations based on interactions, discussions and monitored KPIs. Agent Assist helps match agent skill to the reasons why customers are calling. In addition, information may be provided to the agent from third-party sources via the web servers 160 (e.g., knowledge bases of product manufacturers) or social media platforms.

Figure 4:
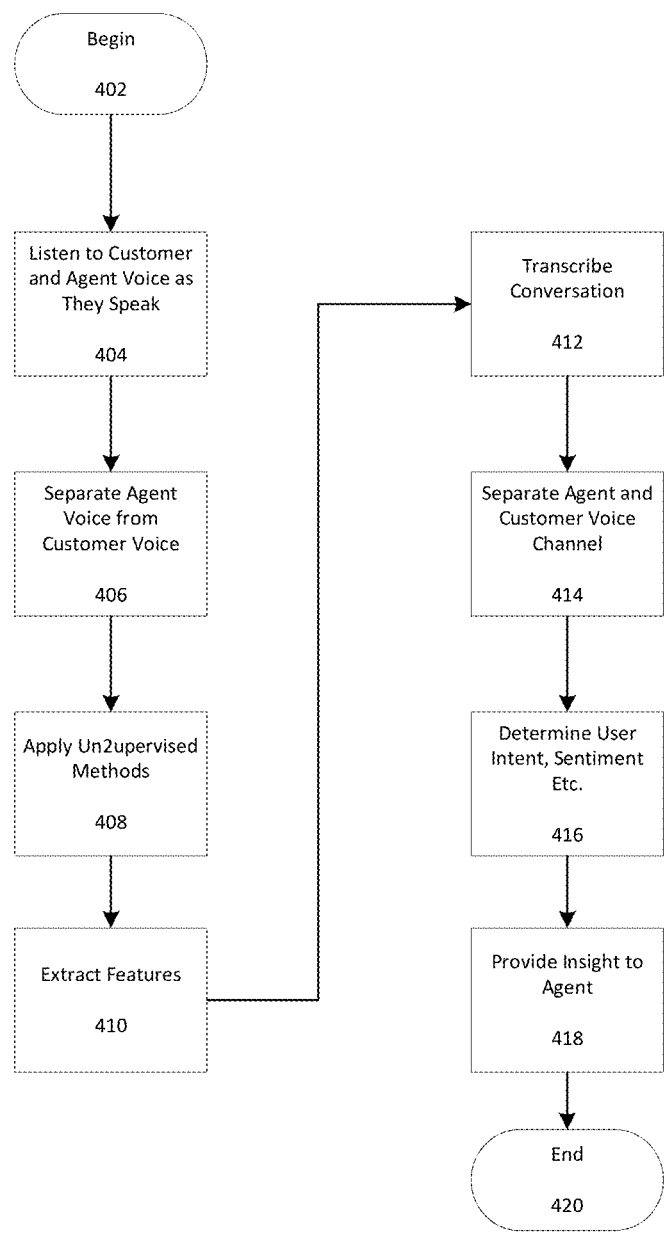
FIG. 4 illustrates an example operational flow in accordance with the present disclosure and provides additional details of the high-level overview shown in FIG. 3.

With reference to FIG. 4, there is illustrated an example operational flow 400 in accordance with the present disclosure, and provides additional details of the high-level overview shown in FIG. 4. At 402, the process begins wherein the system listens the customer and agent voices as they speak (S. 404). For example, the automation infrastructure 200 may process the customer speech, as described with regard to FIG. 2. At 406, the agent voice is separated from the customer voice into their own respective channels. Once separated, at 408, unsupervised methods may be used to automatically perform one or more of the following non-limiting processes: apply biometrics to authenticate the caller/customer, predict a caller gender, predict a caller age category, predict a caller accent, and/or predict caller other demographics. Optionally or alternatively, if speaker separation is not performed at 406, then the system may distinguish between the customer and the agent by analyzing time that either the agent or the customer talks or listens, identify signature of agent voice or user voice, or apply non-supervised methods to separate user and agent voice in real-time.

The operational flow continues at 410, wherein the customer voice and/or agent voice may be analyzed before transcription to extract one or more of the following non-limiting features:
Pain
Agony
Empathy
Being sarcastic
Speech speed
Tone
Frustration
Enthusiasm
Interest
Engagement Understanding these features helps the agent 120 better understand the customer 110. The agent 120 will be better able to understand the customer's problem or issues so a resolution can be more easily achieved.

At 412, the conversation between the agent and the customer is transcribed in either real-time or post-call. This may be performed by the speech-to-text component of the automation infrastructure 200 and saved to a database. At 414, the agent voice channel and the customer voice channel are separated. At 416, the automation infrastructure 200 determines information about the customer and agent, such as, intent, entities (e.g., names, locations, times, etc.) sentiment, sentence phrases (e.g. verb, noun, adjective, etc.). At 418, from the information determined at 416, Agent Assist provides useful insight to the agent 120. This information, as shown in FIG. 3, may be information retrieved from the relevant CRM, the most relevant documents in the related knowledge base, and/or a relevant conversation and interaction that occurred in the past that was related to a similar topic or other feature of the interaction between the agent and the customer. Information pulled from the knowledgebase may be highlighted to the agent in a display, such as shown in FIGS. 5A-5C, 7 and 13.

Thus, in accordance with the operational flow of FIG. 4, Agent Assist provides real-time guidance for frontline employees to respond to customer needs quickly and accurately. As a customer 110 states his or her need, agents 120 will be delivered answers or supporting information immediately to expedite the conversation and simplify agent effort. By delivering information from CRM 304 or knowledgebase 302 to the agent 120 in milliseconds, agent handling time will handle be reduced and customers will realize a time savings and ultimately a reduction in effort to interact with businesses.

Figure 5:
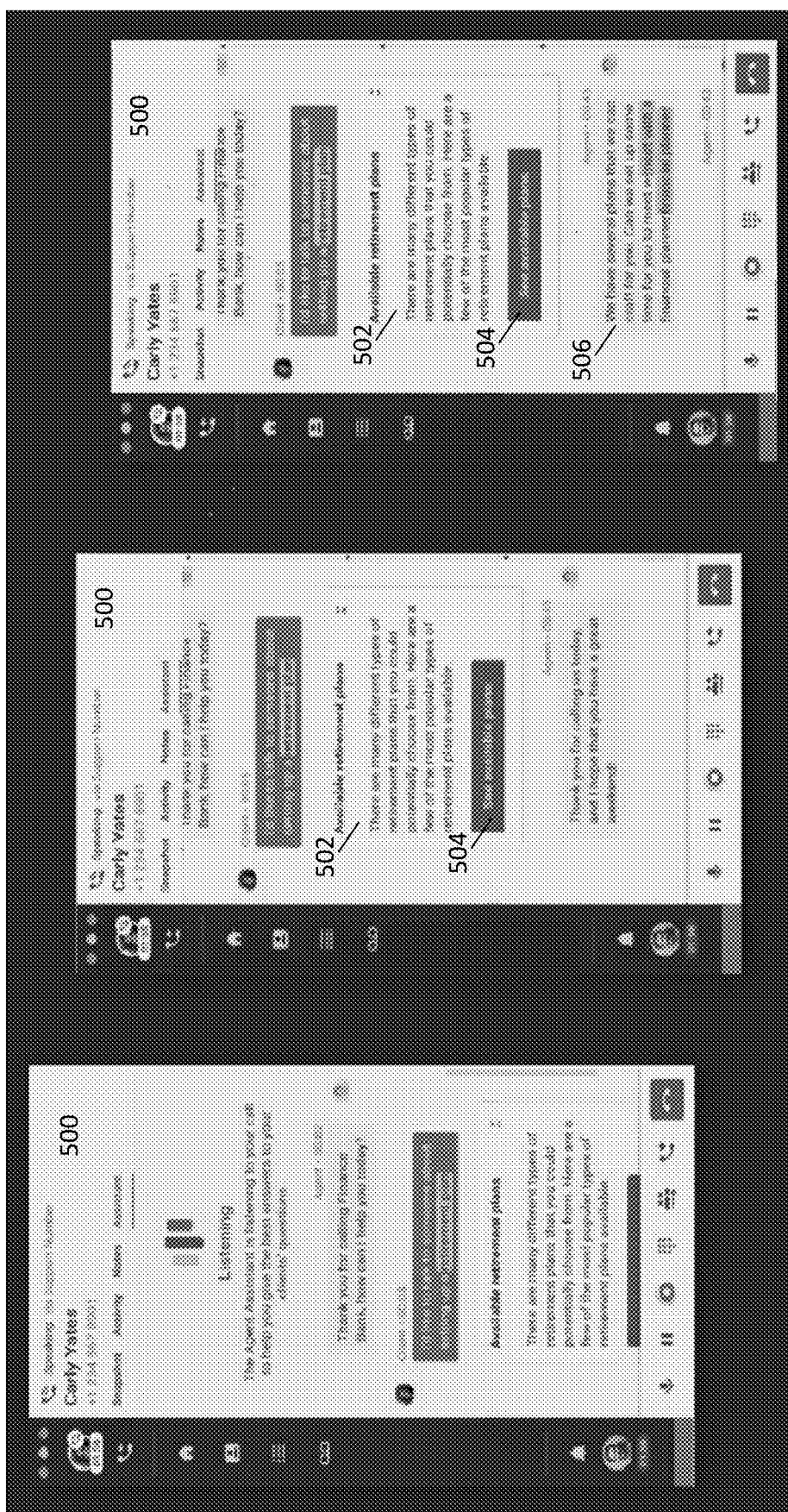
FIGS. 5A, 5B and 5C illustrate an example unified interface showing aspects of the operational flows of FIGS. 3 and 4.

FIGS. 5A-5C illustrate an example unified interface 500 showing aspects of the operational flows of FIGS. 3 and 4. In FIGS. 5A-5C, the agent 120 is speaking on behalf of a financial institution. The agent 120 could be speaking on behalf of any entity for which the cloud-based contact center 150 serves. As shown in FIG. 5A, the customer 110 is calling to ask questions about setting up a retirement plan. Because the context of the conversation is understood by the automation infrastructure 200 to be related to a financial institution, Agent Assist identifies that the term "retirement plan" is meaningful and highlights it to the agent. As shown in FIG. 5B, Agent Assist provides a prompt 502 indicating to the agent 120 that there are many different types of retirement plans that the customer 110 can choose from. A button or other control 504 is provided such that the agent 120 can click a link to see more information. The link to the information may provide text, audio, video, messages, tweets, posts, etc. to the agent 120. Agent Assist provides a segment and/or snippet in the text that is relevant to the customer's needs. In other implementations, Agent Assist provides a relevant interaction in the past (e.g., a similar call with a similar issue that agent 120 was able to address, etc.) or provide cross channel information (e.g., find a most relevant e-mail for a call, etc.). As shown in FIG. 5C, Agent Assist may provide an option 506 to schedule a meeting or call between the customer 110 and a financial planner (i.e., a person with additional knowledge within the entity who may satisfy the customer's request to the agent 120). Additional details of the scheduling operation are described below with reference to FIG. 8.

Smart Notes

Figure 6:
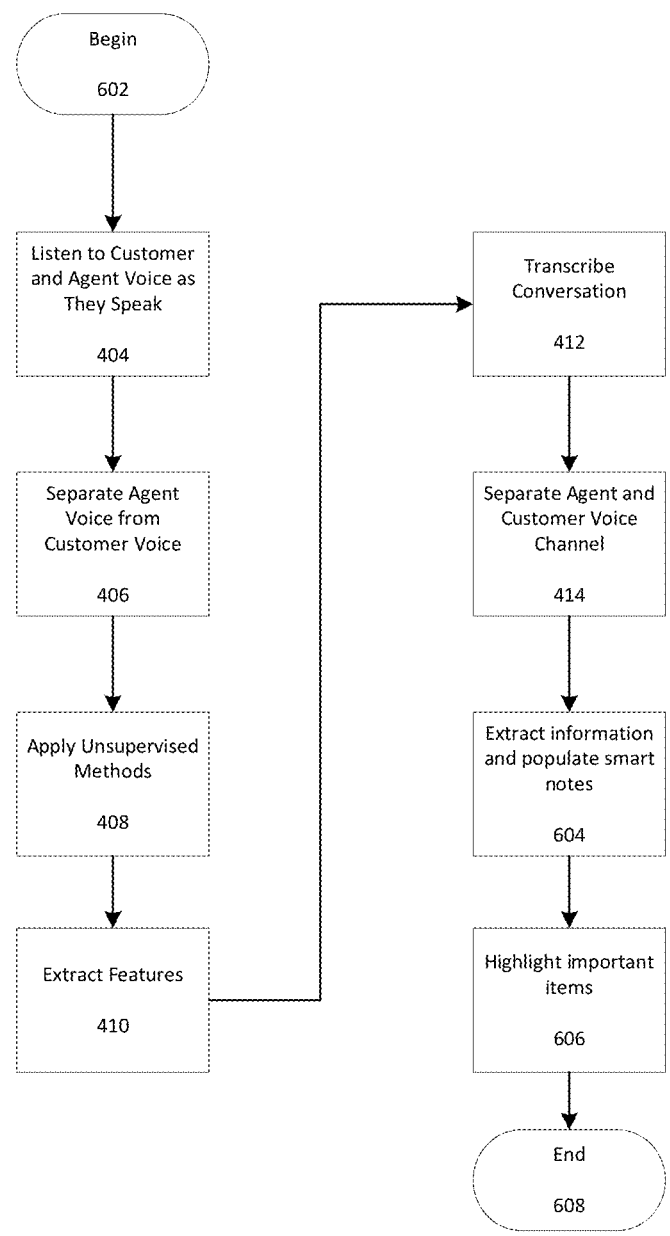
FIG. 6 illustrates an operational flow to analyze a conversation to create smart notes.
Figure 7:
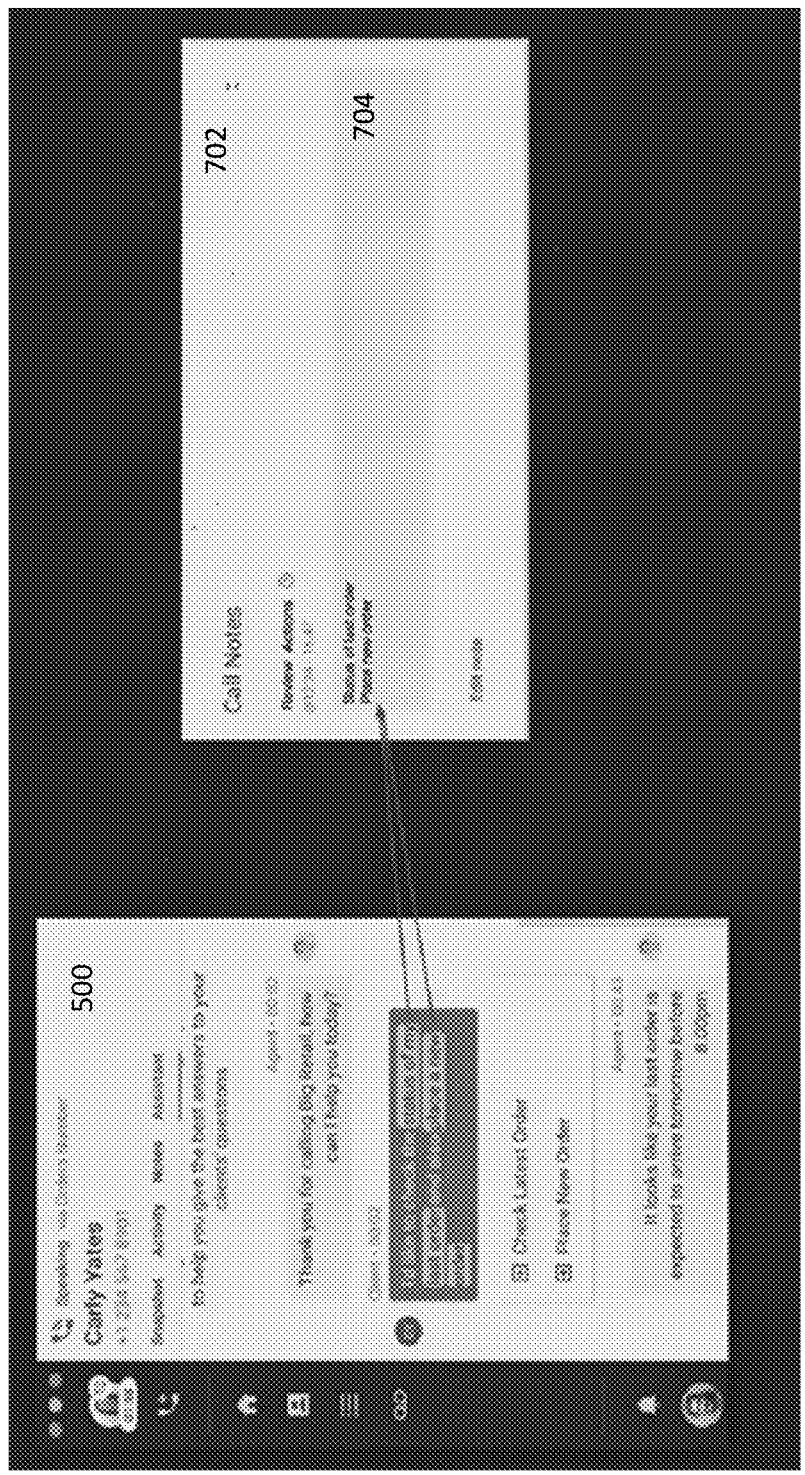
FIG. 7 illustrates an example smart notes user interface.

FIGS. 6 and 7 provide details about the smart notes feature of Agent Assist. The smart notes feature may be used by the agent 120 to summarize a conversation with the customer 120, extract relevant portions of the interaction, etc. Important items in the smart notes may be highlighted using bold fonts or other. The process begins at 602 where operations 404-414 are performed. These may be performed in parallel with the other features described above. At 604, information is extracted from the transcript and populated into the smart notes. As shown in FIG. 7, a call notes user interface 702 is provided to the agent 120 with information from the call with the customer 110 pre-populated in an input field 704. For example, in the context of a retailer, the phrases "status of my last order" and "place a new order" may be determined to be relevant information by the automation infrastructure 200, and is populated into the call notes input field 704. At 606, important terms may be highlighted. At 608, the process ends. As shown in FIG. 7, the call notes user interface 702 may provide an option for the user to edit and/or add notes.

In accordance with the operations performed in FIG. 6, Agent Assist may analyze the conversation between the agent 120 and the customer 110 to create smart notes. This conversation could be a phone call, a text message, chat or video call, etc. Smart notes extracts the most relevant information from this conversation. For instance after a conversation, Agent Assist may determine that the discussion between the agent and the customer was about "canceling an old order" and "placing a new order." These would be extracted as Smart Notes and provide to the agent, who has an option to accept or modify the note, as show in FIG. 7. To achieve the above, Agent Assist may separate the conversation between customer 110 and agent 120 to find words and phrases that are common between agents and customers, when a customer confirms a question, or when an agent confirms what customer says. For instance, the agent 120 may say, "Ok, so you would like to place a new order—correct?" In this case, the Smart Note would be a summary of the call about placing a new order.

Automatic Data Entry

Figure 8:
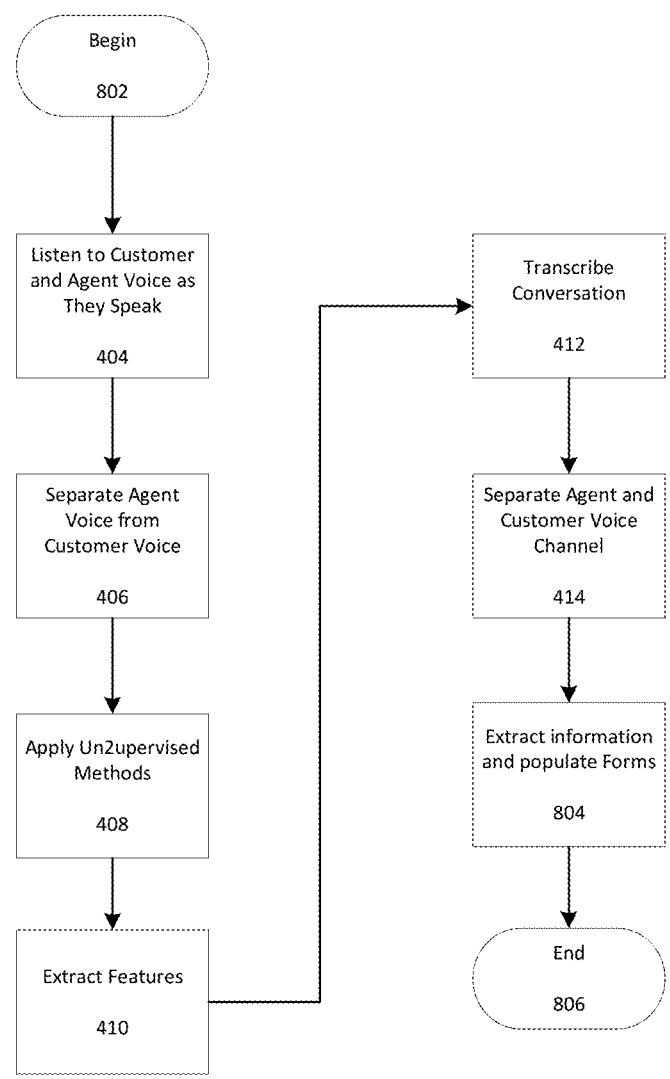
FIG. 8 illustrates an operational flow to analyze a conversation to pre-populate forms.
Figure 9:
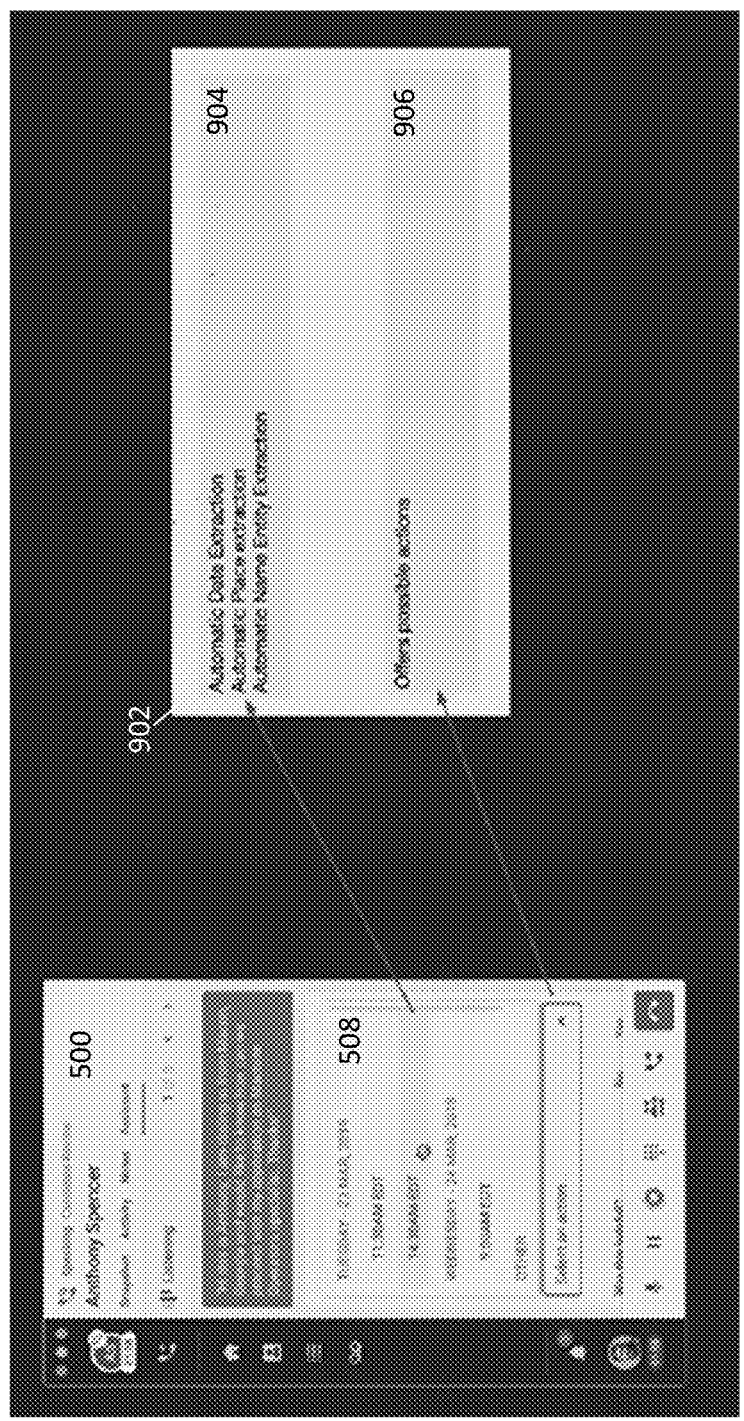
FIG. 9 illustrates an example automatic scheduling user interface.

In accordance with aspects of the disclosure, when Agent Assist detects the participants in a conversation it may automatically fill out any forms that pop-up after such conversations. With reference to FIG. 8, the process begins at 802 where operations 404-414 are performed. These may be performed in parallel with the other features described above. At 804, information is extracted to populate forms. As shown in FIG. 9, in response to the customer indicating that he or she is calling to move forward on a job application, scheduling information may be presented to the agent in a field 508. This information may populate into user interface (902) field 904 together with additional information in field 906 to schedule the call for an interview with the appropriate person. In another example, if the person says, "Hi my name is John? I like to return my iPhone 6," a form may pop up with some of the information such as Name: John and Phone: iPhone 6 prefilled into the form.

Such automated data entry includes but not limited to:
Date
Time
Day of the week
First name
Last name
Gender
Address
Object e.g., Samsung Galaxy
Type of the Object—e.g. Galaxy S9
Time of the day (e.g. morning, afternoon)

After the information is populated, the process ends at 806.

Real-Time Analytics and Error Detection

Figure 10:
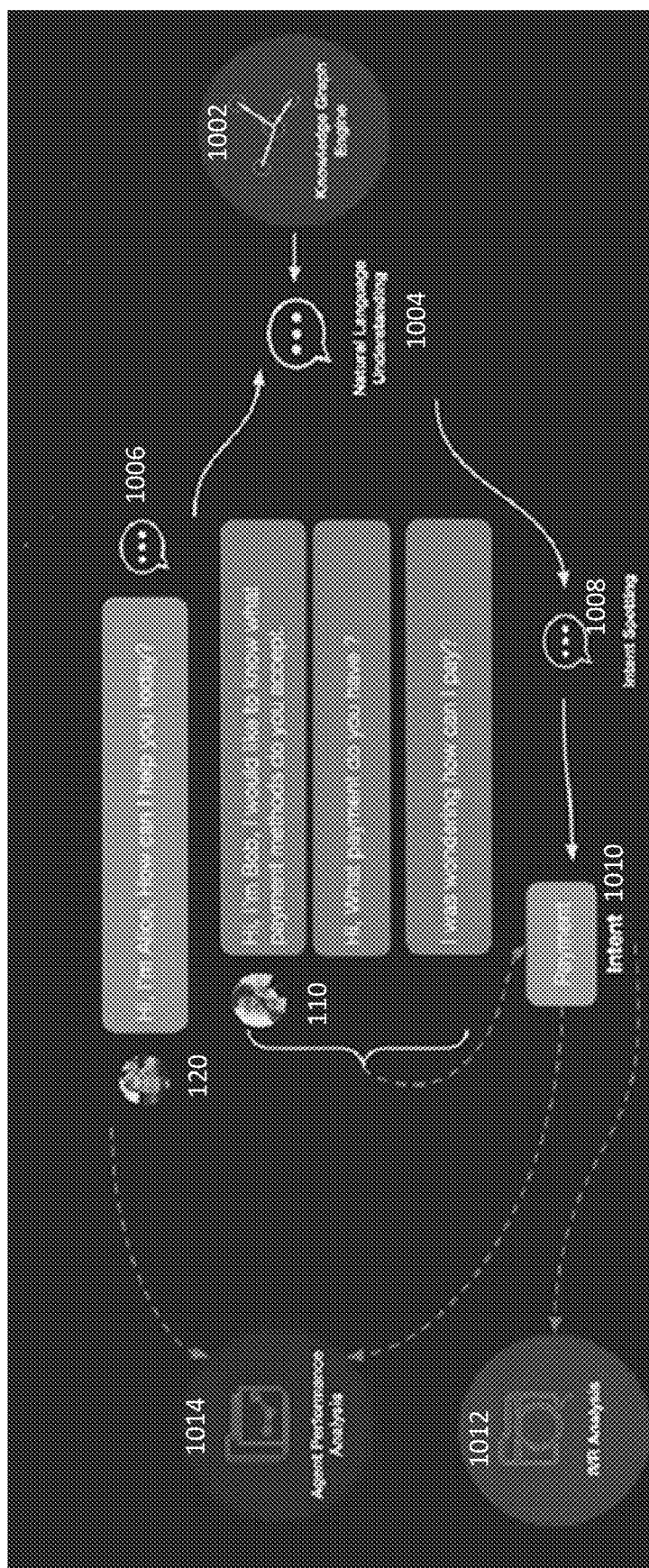
FIG. 10 illustrates an overview of the real-time analytics aspect of Agent Assist.

With reference to FIG. 10, Agent Assist may provide for real-time analytics and error detection by monitoring a conversation (i.e., a call, a text, an e-mail, video, chat, etc.) between the customer 110 and agent 120 in real-time to detect the following non-limiting categories:

Compliance—words that should not say in the conversation.
Competitors—if agent says the name of competitors.
A set of "do's and don'ts"—words that agent should not say.
If the agent is angry, curse etc.
If the agent is making fun of the caller.
If the agent talks too fast, too slow, or if there is a delay between words.
If the agent shows empathy.
If the agent violates any policy.
If the agent markets other products.
If the agent talks about personal issues.
If the agent is politically motivated.
If the agent promotes violence.

The process monitors the agent in real-time and expands upon the current state of the art, which is monitoring is at word level to monitor the transcript of the conversation and look for certain words or a variation of such words. For instance, if the agent is talking about pricing, the system may look for words such as "our pricing." "our price list," "do you want to know how much our product is," etc. As another example, the agent may say "our product is beating everybody else," which means the price is very affordable. Other examples such as these are possible.

Artificial Intelligence (AI) Processing/Learning

In accordance with the present disclosure, a layer of deep learning 1002 is applied to create a large set of all potential of sentences and instances (natural language understanding 1004) where the agent:

Said X and meant A.
Said Y and meant A.
Said Z but did not mean A.
Said W and meant B.

This sets have several positive and negative examples around concepts, such as "cursing," "being frustrated," "rude attitude," "too pushy for sale," "soft attitude," as well as word level examples, such as "shut up." Deep learning 1002 does not need to extract features, rather deep learning takes a set of sentences and classes (class is positive/negative, good bad, cursing/not cursing). Deep learning 1002 learns and builds a model out of all of these examples. For example, audio files of conversations 1006 between agents 120 and customers 110 may be input to the deep learning module 1002. Alternatively, transcribed words may be input to the deep learning module 1002. Next, the system uses the learned model to listen to any conversation in real time and to identify the class such "cursing/not cursing." As soon as the system identifies a class, and if it is negative or positive, it can do the following:

Send an alert to manager
Make an indicator red on the screen
Send a note to the agent to be reviewed in real-time or after the call
Update some data files for reporting and visualization.

As part of the above, the natural language understanding 1004 may be used for intent spotting 1008 to determine intent 1010, which may be used for IVR analysis 1012 and/or agent performance 1014.

In this approach words are not important, rather the combination of all of words, the order of words and al potential variations of them have relevance. Deep learning 1002 considers all of the potential signals that could describe and hint toward a class. This approach is also language agnostic. It does not matter what language agent or caller speaks as long as there are a set of words and a set of classes, deep learning 1002 will learn and the model can be applied to the same language. In addition to the above, metadata may be added to every call, such as the time of the call, the duration of the call, the number of times the agent talked over the caller could be added to the data, etc.

Listening to Other Agents Conversation in Real-Time

Figure 11:
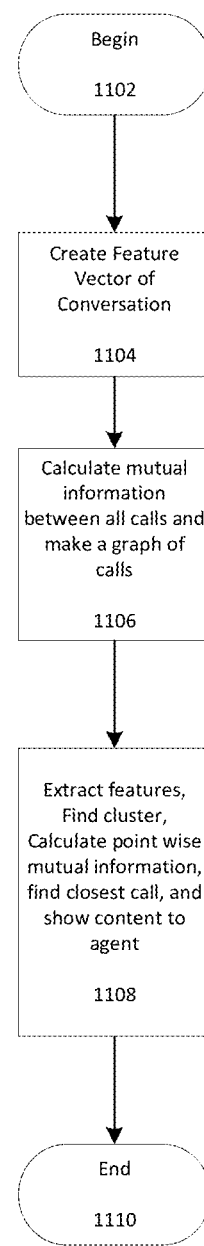
FIG. 11 illustrates an example operational flow to classify agent conversations.

As described above, Agent Assist may periodically perform the following to classify conversations of other agents. With reference to FIG. 11, the process begins at 1102. At 1104, a feature vector of a conversation is created. Such feature vector(s) includes but are not limited to:

Time of the call
Duration of the call
Topic of the call
Frequency of words in the customer transcription (e.g. Ticket 2, Delay 4, etc.)
Frequency of words in the agent transcription (e.g. rebook 3, etc.)
Cluster conversations based on these features At 1106, for the conversation happening in within a predetermined period (e.g., one month), the following are performed:

Calculate the point wise mutual information between all of the calls in one cluster
Make a graph of all calls in which the strength of the link is the weight of the point wise mutual information.

At 1108, for the current file:
Extract features
Find the cluster
Calculate the point wise mutual information
Find the closest call to the current call
Show the content of the call to the agent.
At 1110, the process ends.

Learning Module

While the process 1100 analyzes calls, Agent Assist learns and improves by analyzing user clicks. As relevant conversations are presented to the agent (see, e.g., 306), if the agent clicks on a conversation and spends time on it, then it means that the conversation is relevant. Further, if the conversation is located, e.g., third on the list, but the agent clicks on the first conversation and moves forward, Agent Assist does not make any assumptions about the conversation. Hence, the rank of the conversation may be of importance depending on the agent's actions. For the sake of simplicity, Agent Assist shows the top three conversations to the agent. If some conversations ranked equally, Agent Assist picks one based on heuristics, for instance any conversation that has not been picked recently will be picked.

Escalation Assistance

Figure 12:
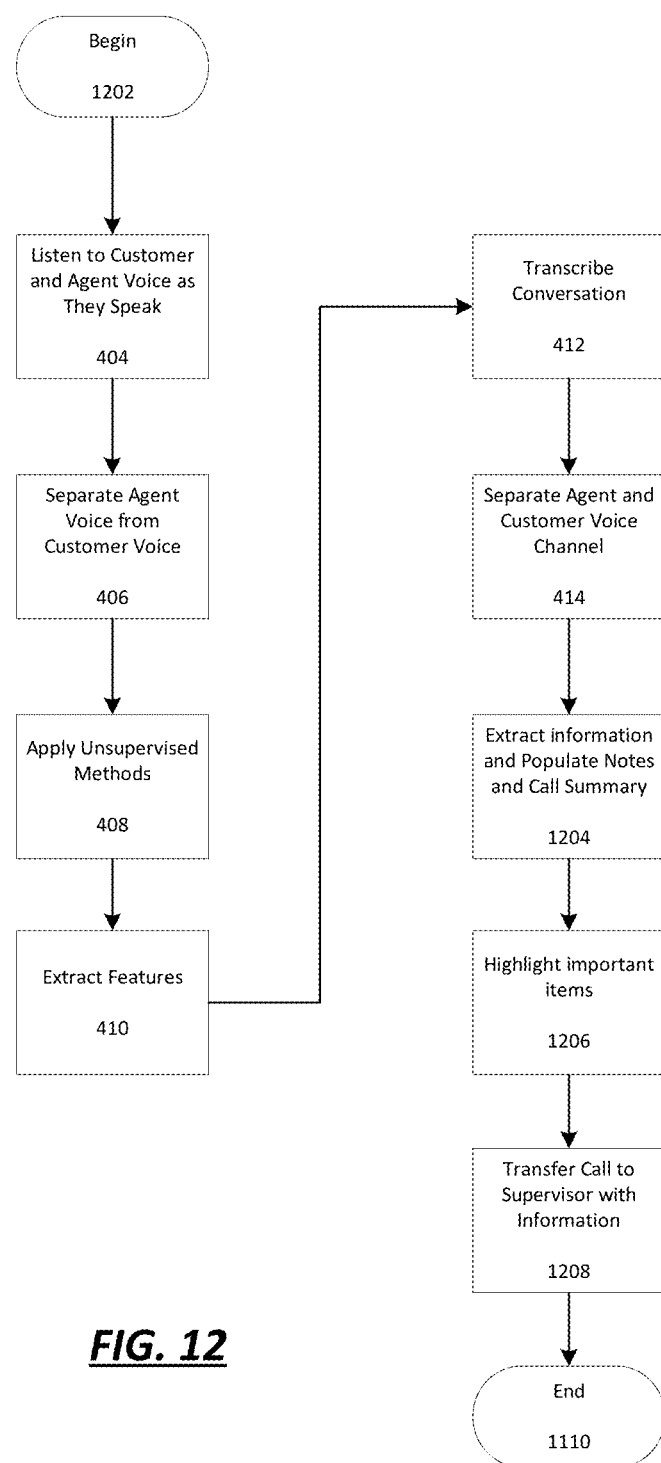
FIG. 12 illustrates an example operational flow of escalation assistance.

With reference to FIG. 12, there is shown an example operational flow of escalation assistance, which may occur when agent cannot answer a customer question or when user is frustrated. With escalation assistance, agent can transfer the call to his or her supervisor, where the transfer will include a summary of the call, along highlights of important notes. In this case, the supervisor has insight into the context and reason for the transfer, and the caller does not need to repeat the case over again. The process begins at 1202 where operations 404-414 are performed. These may be performed in parallel with the other features described above. At 1204, information extracted is from the transcript and populated into the smart notes with a call summary. At 1206, notable items may be highlighted. At 1208, the customer is transferred to the supervisor, where the supervisor is fully briefed on the reasons for the transfer. At 1210, the process ends.

Figure 13:
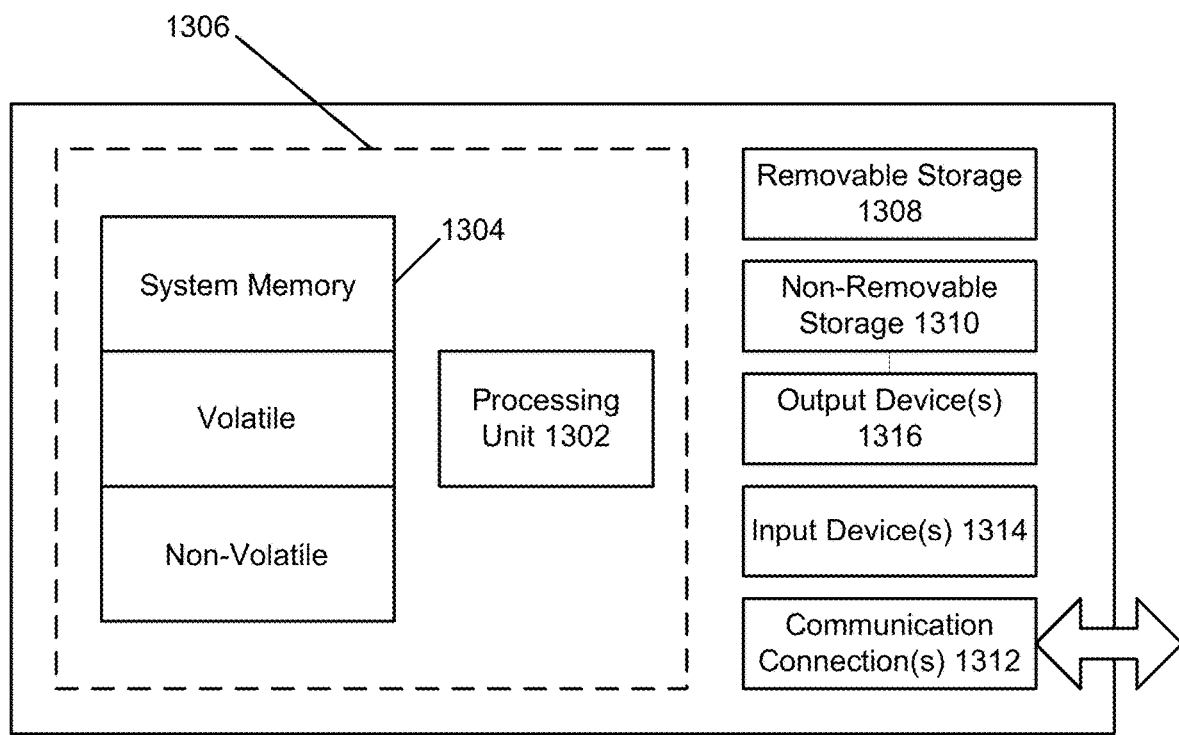
FIG. 13 illustrates an example computing device.

Thus, the present disclosure described an Agent Assist tool within a cloud-based contact center environment that is a conversational guide that proactively delivers real-time contextualized next best actions, in-app, to enhance the customer and agent experience. Talkdesk Agent Assist uses AI to empower agents with a personalized assistant that listens, learns and provides intelligent recommendations in every conversation to help resolve complex customer issues faster General Purpose Computer Description FIG. 13 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), mini-computers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 13, an exemplary system for implementing aspects described herein includes a computing device, such as computing device 1300. In its most basic configuration, computing device 1300 typically includes at least one processing unit 1302 and memory 1304. Depending on the exact configuration and type of computing device, memory 1304 may be volatile (such as random access memory (RAM)), non-volatile (such as read-only memory (ROM), flash memory, etc.), or some combination of the two. This most basic configuration is illustrated in FIG. 13 by dashed line 1306.

Computing device 1300 may have additional features/functionality. For example, computing device 1300 may include additional storage (removable and/or non-removable) including, but not limited to, magnetic or optical disks or tape. Such additional storage is illustrated in FIG. 13 by removable storage 1308 and non-removable storage 1310.

Computing device 1300 typically includes a variety of tangible computer readable media. Computer readable media can be any available tangible media that can be accessed by device 1300 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 1304, removable storage 1308, and non-removable storage 1310 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media may be part of computing device 1300.

Computing device 1300 may contain communications connection(s) 1312 that allow the device to communicate with other devices. Computing device 1300 may also have input device(s) 1314 such as a keyboard, mouse, pen, voice input device, touch input device, etc. Output device(s) 1316 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for automated services in a geographically-distributed cloud-based contact center, the method comprising:
   executing an automation infrastructure within a cloud-based contact center that includes a communication manager, speech-to-text converter, a natural language processor, and an inference processor exposed by application programming interfaces; and
   executing an agent assist functionality within the automation infrastructure that performs operations comprising:
      receiving a SMS text communication from a customer;
      performing inference processing on the SMS text to determine a customer intent;
      automatically analyzing the SMS text to determine a subject of the SMS text communication and key terms associated with the subject;
      automatically parsing a knowledgebase using the key terms for at least one responsive answer associated with the subject; and
      providing the solution to an agent in a unified interface during the communication with the customer.

2. The method of 1, further comprising:
   querying a customer relationship management (CRM) platform/a customer service management (CSM) platform using the key terms; and
   displaying responsive results from the CRM/CSM in the second field in the unified interface.

3. The method of claim 1, further comprising:
   querying a database of customer-agent transcripts using the key terms; and
   displaying responsive results from the database of customer-agent transcripts in the second field in the unified interface.

4. The method of claim 1, wherein the method is performed in real-time as the customer communication progresses with the agent.

5. The method of claim 1, further comprising concurrently displaying to the agent the text in a first field of the unified interface and the solution in a second field of the unified interface.

6. The method of claim 1, further comprising authenticating the customer, predicting a customer gender, predicting a customer age category, predicting a customer accent, and predict customer demographics.

7. The method of claim 1, further comprising extracting features associated with the customer.

8. The method of claim 7, wherein the features comprise pain, agony, empathy, sarcasm, tone, frustration, enthusiasm, interest and engagement.

9. The method of claim 1, further comprising providing the solution as a text-based communication to the customer.

10. The method of claim 1, further comprising highlighting the key terms in the unified interface.

11. A geographically-distributed cloud-based software platform comprising: one or more computer processors; and one or more computer-readable mediums storing instructions that, when executed by the one or more computer processors, cause the cloud-based software platform to perform automated-services operations comprising:
   executing an automation infrastructure within a cloud-based contact center that includes a communication manager, speech-to-text converter, a natural language processor, and an inference processor exposed by application programming interfaces; and
   executing an agent assist functionality within the automation infrastructure that performs operations comprising:
      receiving an SMS text communication from a customer;
      performing inference processing on the SMS text to determine a customer intent;
      automatically analyzing the text to determine a subject of the SMS text and key terms associated with the subject;
      automatically parsing a knowledgebase using the key terms for at least one responsive answer associated with the subject; and
      providing the solution to an agent in a unified interface during the communication with the customer.

12. The cloud-based software platform of 1, further comprising instructions to cause operations comprising:
   querying a customer relationship management (CRM) platform/a customer service management (CSM) platform using the key terms; and
   displaying responsive results from the CRM/CSM in the second field in the unified interface.

13. The cloud-based software platform of claim 11, further comprising instructions to cause operations comprising:
   querying a database of customer-agent transcripts using the key terms; and
   displaying responsive results from the database of customer-agent transcripts in the second field in the unified interface.

14. The cloud-based software platform of claim 11, wherein the operations are performed in real-time as the customer communication progresses with the agent.

15. The cloud-based software platform of claim 11, further comprising instructions to cause operations comprising concurrently displaying to the agent the text in a first field of the unified interface and the solution in a second field of the unified interface.

16. The cloud-based software platform of claim 11, further comprising instructions to cause operations comprising authenticating the customer, predicting a customer gender, predicting a customer age category, predicting a customer accent, and predict customer demographics.

17. The cloud-based software platform of claim 11, further comprising instructions to cause operations comprising extracting features associated with the customer.

18. The cloud-based software platform of claim 17, wherein the features comprise pain, agony, empathy, sarcasm, tone, frustration, enthusiasm, interest and engagement.

19. The cloud-based software platform of claim 11, further comprising instructions to cause operations comprising providing the solution as a text-based communication to the customer.

20. The cloud-based software platform of claim 11, further comprising instructions to cause operations comprising highlighting the key terms in the unified interface.

* * * * *